United States Patent [19]

Knight

[11] 3,995,797

[45] Dec. 7, 1976

[54] TILT MOUNTING HEADS

[75] Inventor: Stanley Hubert Knight, Thetford, England

[73] Assignee: W. Vinten Limited, Bury St. Edmunds, England

[22] Filed: Dec. 2, 1974

[21] Appl. No.: 528,899

[30] Foreign Application Priority Data

Dec. 10, 1973 United Kingdom ............ 57134/73

[52] U.S. Cl. .............................. 248/184; 248/281; 248/371

[51] Int. Cl.² ....................................... F16M 11/12

[58] Field of Search ......... 248/11, 184, 185, 188.2, 248/188.4, 376, 377, 398, 281, 371, 183; 352/34, 243, 210; 354/292, 81

[56] References Cited

UNITED STATES PATENTS

| | | | |
|---|---|---|---|
| 2,567,068 | 9/1951 | Halmer | 248/184 |
| 2,758,816 | 8/1956 | Pickard et al. | 248/185 |
| 2,766,007 | 10/1956 | Krilanovich | 248/281 |
| 3,071,887 | 1/1963 | Von Arb | 248/188.4 |
| 3,273,484 | 9/1966 | Lapsley | 352/243 |
| 3,627,241 | 12/1971 | Santirocco | 248/11 |
| 3,784,135 | 1/1974 | Owen | 248/11 |
| 3,883,105 | 5/1975 | Matsumoto | 248/281 |

FOREIGN PATENTS OR APPLICATIONS 984,293   2/1951   France ............................... 248/11

*Primary Examiner*—Robert A. Hafer
*Attorney, Agent, or Firm*—Larson, Taylor & Hinds

[57] ABSTRACT

The invention comprises a light weight tiltable mounting head for an article such as a television camera wherein the C. of G. of the article, when the article is tilted either fore or aft, moves in a straight line parallel to a guide which may be a level surface.

11 Claims, 7 Drawing Figures

TILT MOUNTING HEADS

This invention relates to tilting mountings, and more particularly, though not exclusively, to tilting mountings for supporting articles such as television or cinematograph cameras, or aerial systems such as radar parabolas, in such a manner that the articles may be smoothly and easily tilted, i.e. the extremities of the article in a longitudinal plane change their angle of elevation to the C.G., centre of gravity, of the article. A camera panning head has the further function of permitting a camera to be panned i.e. turned to and fro, or rotated about, an axis lying in a verticle plane. Hereinafter the invention is described with reference to a camera, but it will be understood that other articles may be mounted on such tilting mountings.

In practice, owing to the weight of the camera tending to increase any tilt of the camera, it has been found difficult to achieve the desired smooth and easy tilting action, either away from or towards the horizontal longitudinal frame. In order to overcome this, there have been employed panning heads including springs, which exert a force contrary to the weight of the camera, there have been panning heads of the so-called quadrant type in which the camera is held with its centre of gravity at the centre of curvature of a circular segment which is movably supported, for example, on rollers or on a track, and there have also been used panning heads with curved cam plates and roller mechanisms for maintaining the centre of gravity in a horizontal plane. These known panning heads have various disadvantages; for example, with springs there may be noise, the springs may tire with time or have to be changed for different cameras, and the force of the spring is not correct throughout the whole range of tilt, which can be successfully used in practice. The quadrant type head is unduly long and clumsy, and the range of tilt with such heads is limited even more than springs. The curved cam plates and roller mechanisms require different cams for different types of camera, and the curved cam plates are difficult to design and manufacture.

An object of the invention, therefore, is to provide an improved tilting mounting in which the above mentioned disadvantages are reduced or obviated.

According to the invention we provide a tiltable mounting for an article, comprising a mounting frame, a tiltable support member to which said article may be secured, pantographical linkage operably connecting said mounting frame and said tiltable support member, load bearing means located on at least one link of said pantographical linkage and a guide means, located on said mounting frame, for guiding said load bearing means and for maintaining the centre of gravity of the article mounted on said tiltable member in a path parallel to that of said load bearing means along said guide means.

An embodiment of the invention will now be described, by way of example only, with reference to the accompanying drawings in which, FIG. 1 shows the basic principles of the linkage at a 10° tilt with a C. of G. 5 inches above the tiltable support member.

Figure 1:
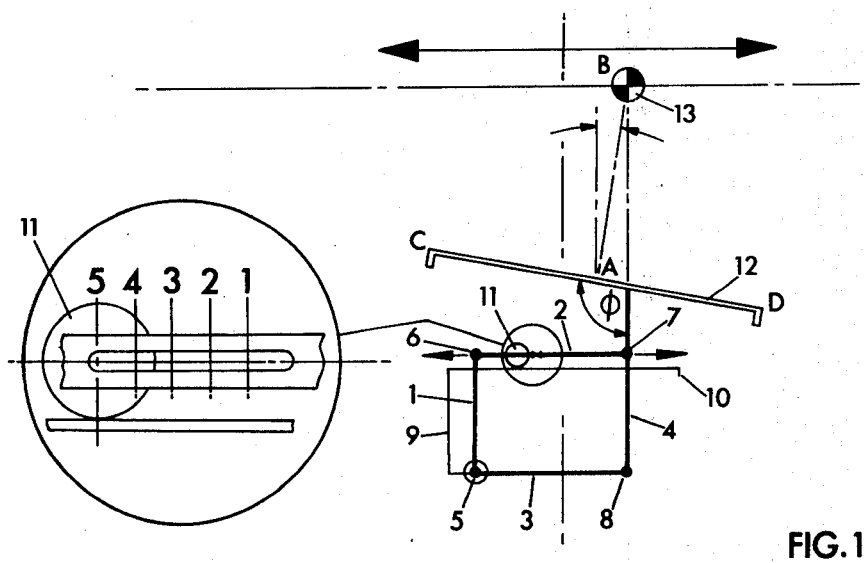
Figure 2:
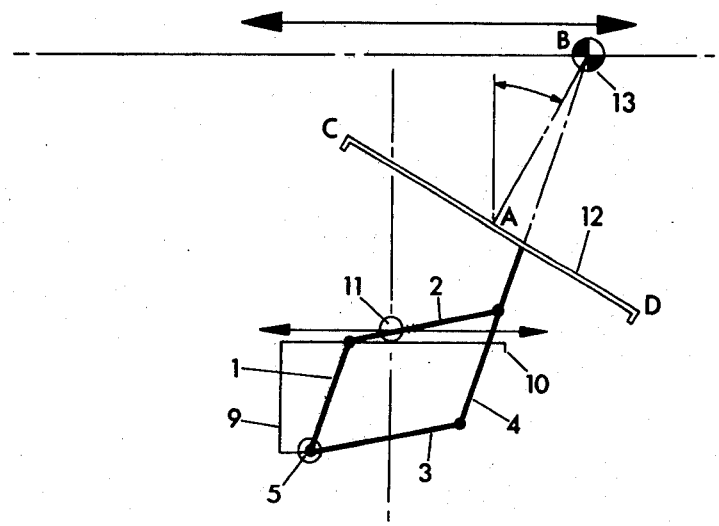
FIG. 2 shows the basic principle of the linkage at a 30° tilt with a C. of G. 5 inches above the tiltable support member.

Referring to FIG. 1 pantographical linkage comprising links 1, 2, 3, and extended link 4 pivotably joined with pivot pins 5, 6, 7 and 8 form a parallelogram having pivot 5 pivotably located on a mounting frame 9. A guide means 10, preferably in the form of a fixed horizontal roller track is fixedly connected to the mounting frame 9 and is preferably part of and made integral with the mounting frame 9. A load bearing means 11, preferably adjustable, attached at a suitable point of the link 2, slidably contacts an upward facing surface of the guide means 10. A tiltable support member 12 is suitably attached to the extended end of link 4 to form an angle of approximately 100° with the extension of link 4. It is to be understood that this angle, and a 10° angle of intersection to be discussed later, are chosen in this particular embodiment with consideration only to the apparent compactness of design and are not functional requisites. This angle is shown as angle $\phi$ on FIG. 1, and with the linkd 1, 2, 3 and 4 forming a rectangle, an extended link of link 4 intersects the right angled bisecting line, AB, of the longitudinal line CD, of the tiltable support member 12 at a point 5 inches along the right angled intersecting line AB, the intersecting lines forming a 10° angle of intersection. This is the preferred attachment positioning as it sets the C. of G. 13, assuming the C. of G. of the article is 5 inches above the base line and longitudinally central in the article, 5 inches above the mid-point of the tiltable support member with the tiltable support member level. FIG. 2 shows that by tilting the tiltable support member from an angle of 10° tilt, as in FIG. 2, the load bearing means 11 moves along the guide means 10 and the C. of G. of the article moves parallely therewith, thus maintaining the balance of the article on the tiltable support member. Movement of the load bearing means in the opposite direcion again moves the C. of G. in the direction of the load bearing means and parallel therewith. The insert of FIG. 1 shows the settings of an advantageous adjustable load bearing means so that the load bearing means may be adjusted to suit C. of G's. from the tiltable support member upwards. The particular settings shown in this case are 0, 1 inch, 2 inches, 3 inches, 4 inches and 5 inches above the tiltable support member, with the load bearing means 11 shown at a 5 inch C. of G. position. It is however, to be understood that these settings may be extended or amended to suit particular requirements.

Figure 3:
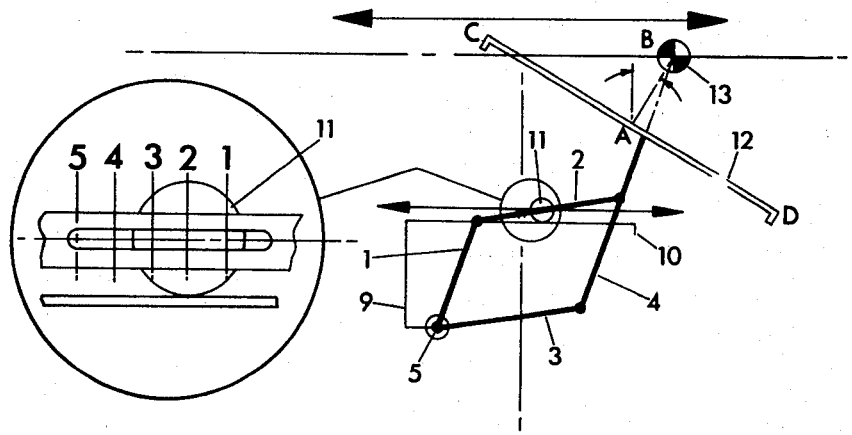
FIG. 3 shows the basic principle of the linkage at a 30° tilt with a C. of G. 2 inches above the tiltable support member.

FIG. 3 shows the position of the load bearing means and the line of travel of the C. of G. for an article with a 2 inch C. of G. It will be noted that the C. of G., when the tiltable support member is tilted, still moves in the same direction and parallely to the load bearing means.

Figure 4:
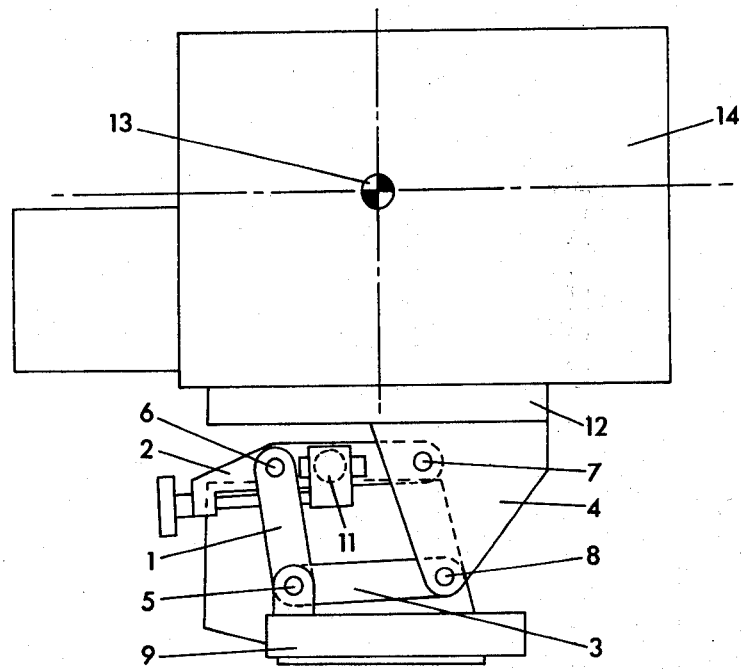
FIG. 4 shows a side elevation of the linkage of a fully adjustable balanced head, levelled, and with longitudinal line through C. of G. of article parallel with floor.
Figure 5:
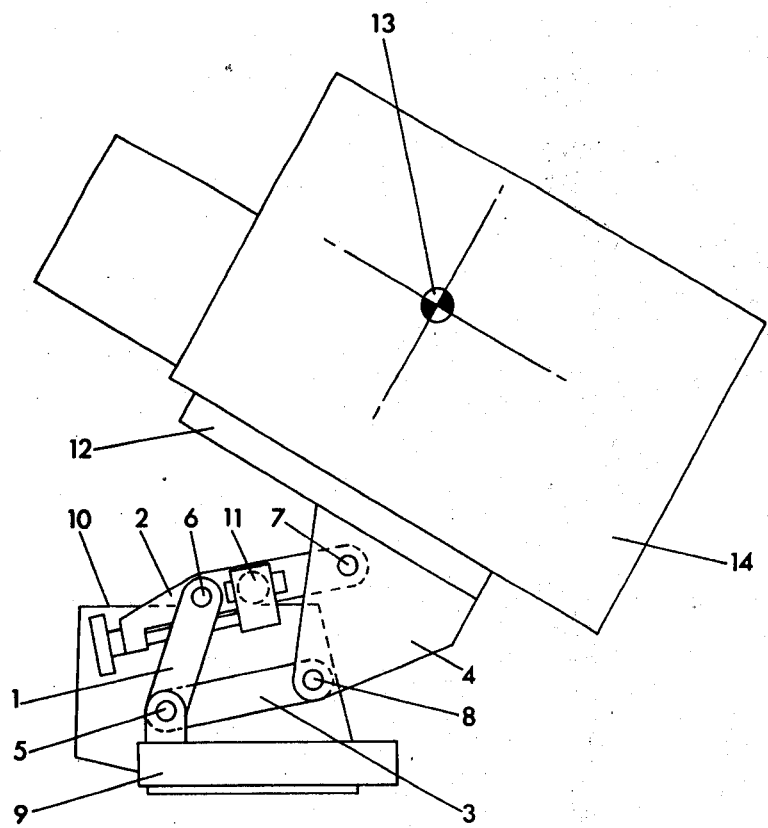
FIG. 5 shows a side elevation of the linkage of a fully adjustable balanced head tilted with the C. of G. of the article projected along the parallel longitudinal line of FIG. 4.

Referring the FIGS. 4 and 5 wherein a practical construction is shown having thereon a camera 14, it is to be noted that with the load bearing means 11 set to the correct position for the C. of G. 13, of the camera 14, the C. of G. of the camera moves in a parallel path to that of the load bearing means 11 on the guide means 10.

Figure 6:
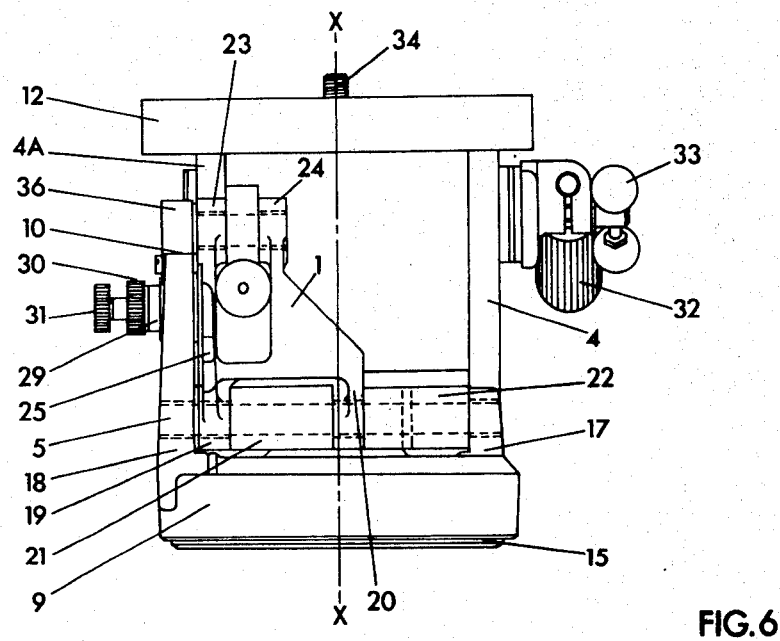
FIG. 6 shows an end elevation of the fully adjustable balanced head.
Figure 7:
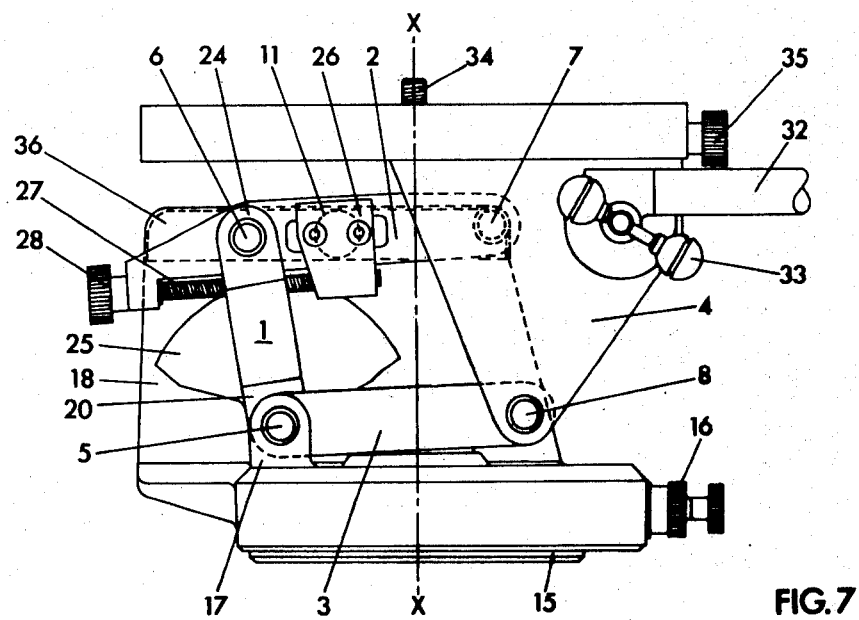
FIG. 7 shows a side elevation of the fully adjustable balanced head.

The panning head illustrated in FIGS. 6 and 7 comprises a mounting frame 9 mounted on a base plate 15 for rotation about a vertical axis X X. The mounting frame is connected to the base plate 15 by way of a centre bolt and bearing means, not shown, arranged to prevent lateral movement of the mounting frame relative to the base plate and to act as a thrust bearing transmitting the weight of the mounting frame, and other parts thereon, to the base plate 15. The base plate 15 is adapted to be secured to a tripod or boom etc. in a known manner. To vary the panning torque or to clamp the mounting frame on a desired heading a friction brake, not shown, may be fitted and may be adjustable by an adjuster control 16.

Extending upwardly from the mounting frame 9, which preferably has an upward facing surface of rectangular shape, from one end of the long sides and preferably integral therewith, are two side walls 17 and 18. Side wall 17 being smaller than side wall 18 as shown in the diagrams. Extending between the side walls 17 and 18 and rotatable therein is the pivot pin 5, located on which are the links 1 and 3. Link 1 preferably being rotatable about the axis of the pivot pin 5 which extends through the two lugs 19 and 20, and link 3 being preferably fixedly attached to the pivot pin 5 which extends through lugs 21 and 22. Two further lugs 23 and 24, at the other end of link 1, have located there between, one pivot point of link 2 through which pivot pin 6 extends, being fixedly secured to link 2 and rotatable within the lugs of link 1. Attached to, or manufactured as a part of, link 1, is a quadrant 25 which determines the maximum angle of tilt, in the fore and aft directions, which may be obtained on the tiltable support member 12. Link 4 and 4A are inverted, generally trianglular shaped, structures of indentical shape and size having aligned holes for pivot pins 7 and 8, pivot pin 8 extending widthways though the opposite end of link 3 to that of pivot pin 5 and having pivot pin 8 fixedly secured therein, with links 4 and 4A rotatable about the longitudinal axis of pivot pin 8. Pivot pin 7, fixedly attached at the opposite end of link 2 to pivot pin 6, is rotatably located in the aligned pivot pin 7 pivot hole in line 4A. As link 4A is positioned parallel to link 4 and indirectly attached thereto links 4 and 4A may be considered as one link. Fixedly attached or manufactured integrally therewith, to the base of the inverted generally triangular shaped links 4 and 4A and in a suitable position for easy balancing, is the tiltable support member 12.

Side wall 18 of approximately the same length as the mounting frame, but not necessarily equally spaced about the same centre line, extends upwards terminating in a generally flat smooth surface or guide means 10, preferably parallel with the top surface of the mounting frame 9.

Link 2, at a suitable position between pivot pins 6 and 7, has an elongated longitudinal hole therein for reception of a slider mechansim generally shown at 26, and not detailed. It is sufficient to say that the slider mechansim 26 has on the inward facing end, a bracket to which a threaded adjuster 27 is attached, which, when rotated by a knurled knob 28 on the extended end of link 2, moves the slider mechanism towards or away from pivot pin 6, dependent on direcion of rotation of the knurled knob 28. Located on the outward facing end of the slider mechanism 26 is a cam follower in the form of a load bearing means 11, which is preferably in the form of a stub axle upon which is mounted a needle roller bearing. It is also preferable that the guide means 10 is capped with a hard wearing material such as stainless steel or that a stainless steel strip, or the like, be let into the surface of guide means 10 to reduce the possibility of indentations caused by the load bearing means upon which the weight of the camera rests.

As, due to the C. of G. moving in a parallel path to the load bearing means, there is virtually no "feel" of weight, it is advantageous to be able to apply a false "feel" in the tilting plane or to lock the tiltable support member in a desired position. This may be achieved by a tilt friction device, comprising an adjustable clutch 29 located in the side wall 18, operable on the outward facing surface of quadrant 25 and adjustable by tilt clutch control knobs 30 and 31.

For controlling the panning head and the various positions of tiltable support member 12, an operating arm 32 may be located on either link 4 or 4A and the basic setting of the operating arm 32 relative to the link 4 or 4A may be adjustable by loosening an arm clamp screw 33, selecting a desired position, and retightening the clamp screw.

In operation the camera is first centralized on the tiltable support member 12, this may be obtained by feel when tilting the support member 12 with the operating arm 32, i.e., the same force is required to raise the camera to a level position from an up and down angle of tilt. To facilitate ease of movement of the camera on the tiltable support member a positionable locking means, preferably in the form of a locking screw 34 screwed into the base of the camera which may be slackened by turning a wing nut or the like, not shown, protruding beneath the tiltable support member and moving the camera in a longitudinal direction by rotating a camera adjusting screw 35. Rotation of the camera adjusting screw 35 moves the locking screw 34 in a longitudinal direction in guides, not shown, located on the tiltable support member. On centralization, locking screw 34 is retightened and the C. of G. adjusted by rotation of control knob 28 until the C. of G. of the camera maintains a path parallel to that of the load bearing means 11 along the guide means 10. This may easily be determined by the "feel" of the operating arm 32. That is to say, that if as operating arm 32 is used to position the camera by adjusting the camera's pan or tilt angle, a "feel" of weight is experienced, then either camera adjusting screw 35 or control knob 28 must be readjusted. As described above, operating arm 32 will "feel" no weight when the C. of G. of the camera maintains a path parallel to that of the load bearing means 11 along guide means 10 since the C. of G. will not be changing its elevation above the guide means and thus will not lose or gain potential energy.

Whilst adjusting the position of the load bearing means 11 it is advisable to relieve the weight of the camera from the load bearing means. This may be achieved by tilting the camera forward, inserting a block between pivot pin 8 and the top of the mounting frame 9, or preferably, by means of a very coarse thread screw screwed through link 3 which may be given sufficient degrees of movement, with the camera tilted forward, to make the screw project through the bottom of link 3 to abut against the top of the mounting frame 9, so that when the camera is tilted upwards the weight on the load bearing means is removed, thus facilitating easy resetting of the load bearing means.

To protect the load bearing means 11 and guide means 10 from foreign bodies, a cover 36 may be fitted.

It is preferable that pivot pin pivot holes be bushed or fitted with bearings such as needle roller bearings to improve the smoothness of the tilting operation and, it is also preferable, that end caps be fitted where possible to avoid ingress of foreign matter to the bearing surfaces.

It will be appreciated that various modifications can be introduced without departing from the invention, for example, pivot pin 7 may extend between links 4 and 4A.

From the above description it can be seen that the panning head according to the invention can be made of simple, economic and rigid construction, with an adequate range of tilt, and that the effect of the weight of the camera on the tilting action can be wholly or substantially eliminated. It can also be seen that the structure may be manufactured from light weight material such as aluminium alloys, or the like.

I claim as my invention:

1. A tiltable mounting for moving an article such that the movement of the center of gravity of the article defines a straight line, said mounting comprising:
    a mounting frame;
    a tiltable support member to which the article may be secured;
    pantographic linkage pivotally mounted to said mounting frame, said linkage including at least a first link that is substantially vertical with respect to said mounting frame when said pantographic linkage forms substantially a rectangle, said tiltable support member fixedly mountable to said first link such that said support member can be secured in a fixed manner to said first link, and at least a second link that is substantially horizontal relative to said mounting frame when said pantographic linkage forms substantially a rectangle;
    a load bearing means located on said second link for supporting said second link; and
    a guide means, located on said mounting frame, said load bearing means in engagement with said guide means, said guide means, said linkage and said load bearing means cooperating to tilt said tiltable support member as said load bearing means moves along said guide means such that the center of gravity of the article is maintained along a straight line parallel to the path described by said load bearing means moving along said guide means.

2. A tiltable mounting as claimed in claim 1 wherein an end of said first link is pivotally mounted to an end of said second link and wherein said pantographic linkage further includes:
    a third link located to the left of and parallel to said first link, one end of said third link pivotally mounted to an end of said second link that is distally located with respect to the mounting position of said first link, and the other end of said third link pivotally mounted to said mounting frame, and
    a fourth link located below and parallel to said second link, one end of said fourth link pivotally mounted to an end of said first link that is distally located with respect to the position where said first link mounts said second link, the other end of said fourth link pivotally mounted to said frame in coaxial alignment with said end of said third link.

3. A tiltable mounting for accommodating a range of articles with differently positioned centers of gravity as claimed in claim 1 wherein said load bearing means is adjustably positionable relative to said second link to compensate for the differently positioned centers of gravity.

4. A tiltable mounting as claimed in claim 1 wherein said load bearing means includes a bearing surface, said surface in sliding engagement with said means, said surface located between the ends of said second link.

5. A tiltable mounting as claimed in claim 3 wherein said load bearing means further includes:
    a slide in sliding engagement with said second link; and
    a screw for positioning said slide relative to said second link.

6. A tiltable mounting as claimed in claim 1 wherein said load bearing means is a cam follower and wherein said guide means is a cam, said follower in rolling engagement with said cam.

7. A tiltable mounting as claimed in claim 1 having a positionable locking means for securing the article in the correct position on said tiltable support member.

8. A tiltable mounting as claimed in claim 1 further comprising a tilt friction means including an adjustable clutch for increasing the force required to move said load bearing means along said guide means, thereby producing a false feel of weight, and for the lockingly positioning of said tiltable support member.

9. A tiltable mounting in accordance with claim 1 wherein said mounting frame is mounted on a panning head.

10. A tiltable mounting in accordance with claim 1 further including an operating arm for controlling the angle of tilt and pan.

11. A tiltable mounting in accordance with claim 10 wherein said operating arm is adjustable.

* * * * *